April 25, 1967 R. WISOTZKY 3,316,137
CONTINUOUS PROCESS OF MAKING SPONGE-BACKED FLOORING
Filed May 12, 1964
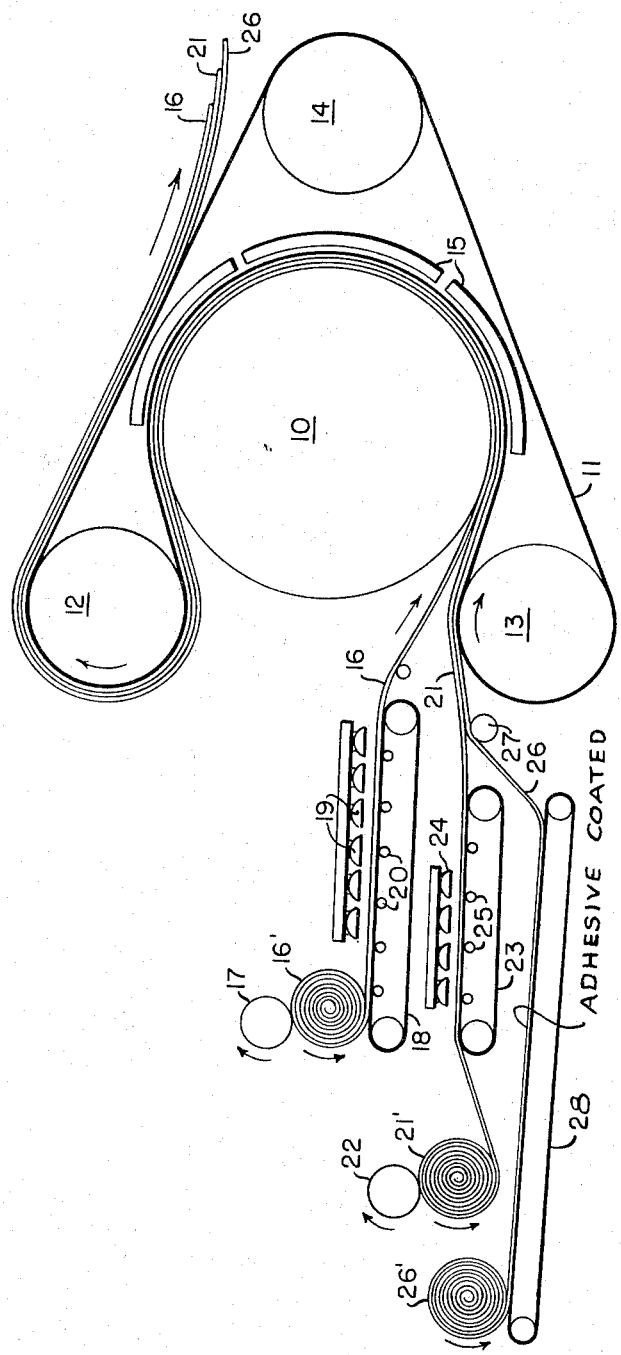
INVENTOR.
Reuben Wisotzky
BY
Kenway, Jenney, Witter & Hildreth 3,316,137
CONTINUOUS PROCESS OF MAKING
SPONGE-BACKED FLOORING
Reuben Wisotzky, Lexington, Mass., assignor to American Biltrite Rubber Co., Inc., Dover, Del., a corporation of Delaware
Filed May 12, 1964, Ser. No. 373,123
7 Claims. (Cl. 156—209)

This invention comprises a new, improved and continuous process of making sponge or foam backed flooring of elastomeric or plastic materials.

Sponge elastomers of blown or foam type have long been used as a resilient cushion or backing of various types of flooring in order to secure greater comfort and quietness for the householder and prolonged life for the flooring product.

Sponge, felt or textile cushions of various types have been employed with many types of soft or semi-soft floor coverings and for the elastomeric types including vinyls and compounds of rubber the employment of elastomeric sponges in sheet form has proven most satisfactory.

Sponge underlay may be used with elastomeric flooring as a separate layer or sheet or it may be permanently attached to the flooring itself. The latter application is much to be preferred since a bonded cushion ply is not easily displaced, is convenient to handle, is easier to maintain and much more easily cleaned. Moreover sponge and foam sheets are comparatively fragile and readily damaged when laid separately in large thin sheets. For this reason it is very desirable to bond the sponge or foam cushion as a laminated ply to the flooring itself so that both plies may be handled together as a single unit.

The bonding of the sponge or foam cushion to the flooring may be done by coating with cement the flooring or the cushion ply or both and then superposing the plies and allowing the cement bond to set. A second procedure usually employed when elastomers of rubber compound are used consists in combining the flooring and cushion layer or ply and then simultaneously molding and vulcanizing them to form an integral unit. Neither of the procedures described have proven entirely satisfactory. Flooring having a cement bonded cushion is costly to make because of the variability in drying times of cements as well as difficulty in applying a smooth and unbroken coating of cement. On the other hand the simultaneous vulcanizing, molding and bonding of an elastomeric flooring layer to a sponge or foam ply is difficult and uncertain on account of the differences in the optimum time, temperature and pressure conditions required to accomplish the desired molding, adhesive bonding and state of cure or vulcanization.

In dealing with the vinyl types of flooring it has been found that the relatively high temperatures, prolonged time and high pressures required to mold these materials are likely seriously to damage the resilient cushioning qualities of a sponge or foam ply if present with a face ply of the flooring when subjected to conventional molding treatment. The process of the present invention successfully obviates the difficulties above mentioned and provides a continuous process whereby elastomeric flooring may be simultaneously molded to the desired contour and surface texture and at the same time combined with any preferred type of resilient sponge or foam cushion.

In one aspect this novel process is characterized by the steps of separately preheating to molding temperature a facing ply and one or more intermediate plies of plastic material, advancing these plies in separate paths to a line of common contact, leading an unheated heat-activatable cement-coated sponge or foam cushion ply into contact with the preheated plies at a point adjacent to their line of contact and only then directly heating the sponge ply to activate the cement coating and subjecting all the plies to molding and bonding pressure.

In bringing the cushion sponge ply which is soft and elastic in its texture to the heating zone it is advantageous to support the ply upon a conveyor belt in order to relieve it of strain that might otherwise stretch or wrinkle the sponge material.

The process herein disclosed combines for the first time the steps of separately or individually preheating one or more plies of solid vinyl material to molding consistency and then uniting to them a cool ply of foam cushion material while the solid vinyl plies of the composite product are being molded, as by having a surface pattern formed thereon.

These and other features and characteristics of the process may be best understood and appreciated from the following description of an illustrative procedure for carrying it out, selected for purposes of illustration in the accompanying drawings in which the figure is a diagrammatic view of apparatus suitable for the purpose.

As herein shown the process of the invention may be carried out with the assistance of machinery of the well known "Rotocure" type as described, for example, in United States Letters Patent No. 2,039,271 Bierer. It comprises essentially a large heated drum 10 mounted for rotation about a horizontal axis and partially encircled by a steel pressure band 11 which is guided in an approximately triangular path by guide rolls 12, 13 and 14. The pressure band is maintained under severe tension by a hydraulic system, not shown, operating to force the roll 14 outwardly. The band is driven by the roll 12 and it in turn drives the drum 10 and the other rolls. The stock to be treated passes slowly about an arcuate path extending throughout two-thirds or more of the circumference of the drum 10, being subjected meanwhile to pressure of the band and heat from the drum and from segmental back heaters 15 disposed concentrically with respect to the drum.

For purposes of illustration it may be assumed that the desired flooring product comprises a facing ply 16, an intermediate ply 21 and a sponge or foam cushion ply 26. Each of these plies has been compounded, plasticized and calendered to the proper thickness for its intended purpose. If desired the face ply may be colored, printed or otherwise decorated. It is placed as a coil 16' on a let-off reel in association with winding roll 17 for the lining sheet with which it comes to the machine.

The uncured face ply 16 is taken from the coil 16' upon a conveyor belt 18 which carries it in a horizontal path between two banks of heaters 19 and 20, preferably radiant electric heaters. The conveyor directs the ply 16 over a small guide roll to the bite of the drum 10 and the pressure band 11. Since the face ply is to be built up with one or more laminated plies it may itself be relatively thin so that it is quickly raised to molding temperature of 285° to 385° F. in passing between the heaters 19 and 20.

The uncured intermediate ply 21 is taken from a coil 21' herein shown as mounted on a let-off reel located below and to the left of the face ply coil 16' and in position to clear it. The coil is associated with a winding roll 22 for taking up the lining sheet of the ply. The ply 21 passes to a conveyor 23 by which it is transferred in a separate horizontal path between two banks of heaters 24 and 25 and directed over a small guide roll 27 and the larger roll 13 to the bite of the drum and pressure band where it meets and makes line contact with the preheated face ply 16. The intermediate ply 21 may be of the same material as the face ply but plain and undecorated.

A satisfactory and typical formula for these plies is as follows:

| | Percent |
|---|---|
| PVC (polyvinylchloride) | 30 |
| DOP (dioctyl phthalate) | 25 |
| Ba-Cd laurate (barium cadmium laurate) | 0.6 |
| TiO₂ (titanium dioxide) | 3.4 |
| CaCO₃ (calcium carbonate) | 41 |

When heated to between 280°–320° F. this material becomes sufficiently soft to respond to molding pressure and any desired surface pattern may be imparted to the face ply from an embossed drum surface.

The cushion ply 26 is taken from a coil 26′ which may be mounted on a let-off reel located outwardly beyond the coil 21′ and in position to clear it. The ply is passed to a conveyor 28 which transfers it without strain in an unheated path below that of the intermediate ply to the small guide roll 27 where the cushion ply meets for the first time the preheated intermediate ply 21 and then over the larger roll 13 to the bite of the drum 10 and the pressure band 11. It will be apparent that the sponge cushion ply 26 is entirely unheated up to the time it meets the solid preheated intermediate ply 21 at the guide roll 27 in its approach to the drum with its heat-activated cement-coated side uppermost. The conveyor 28 is employed so that the cushion ply 26 may be advanced without strain or tension to the treating zone.

Alternatively it has been found practical to utilize an underlying intermediate ply as a conveyor belt for the cushion ply by merely tacking the leading end of the cushion ply to the underlying ply.

The cushion ply may be initially about one-eighth inch in thickness, of light weight and delicate elastic texture subject to distortion under any appreciable strain. The cushion ply may be of polyurethane or polyester foam which is readily obtainable in sheet form as a commercial product.

The intermediate ply 21 may be of the same thickness as the face ply and will be heated to substantially the same molding and curing temperature of 285° to 385° F. It is contemplated that two or more intermediate plies may be separately handled in the same manner as the ply 21 and incorporated in the flooring whenever a thicker product is desired. In any case the face and intermediate plies are brought to the drum 10 thoroughly heated to relatively high molding temperature, while the cushion ply is not highly heated until it is carried into the zone of the back heaters 15 at the drum. The fact that the plies are all handled indivdually in separate paths makes it possible to subject them to the different optimum degrees of heat best suited for their particular composition and characteristics. If the sponge ply were preheated to the temperature of the intermediate ply 21 the sponge ply would be molded into a solid state and lose its cushioning characteristics.

The three or more differentially heated plies, having been assembled at the bite of the drum and band, now pass together about an extended arcuate path in which the cushion ply 26 is heated under the band 11 by the back heaters 15 and the plies are thus united into an integral product and molded to the desired final shape. Meanwhile the face ply may receive an embossed surface texture from the correspondingly patterned drum surface while the resilient character of the cooler sponge ply is maintained without impairment.

This application is filed as a continuation-in-part and substitute for my application Ser. No. 58,724, filed Sept. 27, 1960.

Having thus disclosed my invention and described in detail illustrative examples thereof I claim as new and desire to secure by Letters Patent:

1. The continuous process of making cushion-backed flooring characterized by the steps of separately preheating an uncured face ply of elastomeric plastic material to molding temperature of 285–385° F., separately preheating an uncured intermediate ply of the same material to approximately the same temperature, passing between heated molding surfaces the two preheated plies together with a previously unheated sponge cushion ply having an adhesive-coated surface, applying heat to the sponge cushion ply while in contact with one of said preheated plies through the medium of one of said molding surfaces and thus bonding all plies in a molded cushion-backed flooring.

2. The continuous process of making cushion-backed flooring, characterized by the steps of separately preheating a face ply of elastomeric plastic material to molding temperature, preheating an intermediate ply of the same material to moldable condition, separately advancing the two preheated plies to a line of common contact, leading an unheated sponge cushion ply to the said line of contact with said preheated plies and then subjecting all three plies to bonding and curing pressure and heat, and molding a surface pattern in the three-ply flooring thus produced.

3. The continuous process of making cushion-backed flooring, characterized by the steps of separately preheating to molding temperature a facing ply and an intermediate ply of plastic elastomeric material, advancing the two preheated plies in separate heated paths to a line of common contact, leading an unheated cement-coated sponge-cushion ply in an unheated path into contact with the preheated plies at a point adjacent said line of contact, only then directly heating the sponge-cushion ply to activate its cement coating, and subjecting all three plies to molding, curing and bonding pressure and heat.

4. The continuous process of making cushion-backed flooring, characterized by the steps of advancing a facing ply and an intermediate ply of thin sheet plastic and elastomeric material along separate parallel and individually heated paths in which they are each preheated to a molding temperature and conducted to a line of common contact, advancing an unheated sponge-cushion ply along a separate unheated path toward said line of common contact, introducing an adhesive film on one of said plies, pressing the sponge-cushion ply against the two preheated plies at approximately their line of common contact and thus initially heating the sponge ply, thereafter subjecting the laminated sponge-cushion ply to direct heating and advancing all these plies under molding, curing and bonding pressure in an extended circular path and thus molding a surface pattern upon the facing ply of the three-ply flooring thus produced.

5. The process of making cushion-backed flooring, characterized by the steps of advancing a face ply of plastic material along a horizontal path between banks of heaters and thus heating to molding temperature, preheating an intermediate ply by advancing it along another horizontal path between banks of heaters and spaced from the face ply, advancing a cool ply of sponge cushion material while supported without strain upon an underlying conveyor along still another but unheated path spaced from the other two, adhesively laminating the two preheated plies with the yet unheated cushion ply, and subjecting the laminated plies to curing heat and molding pressure.

6. Apparatus for making cushion-backed flooring from component plies, comprising a heated drum and encircling pressure band, separate let-off reels for a plurality of plies including one of sponge composition, conveyors for transferring the several plies by separate paths to the bite of the drum and band, heaters for individually preheating certain only of said plies on their way to drum while leaving the sponge ply unheated in its path, and means associate with the drum for heating the previously unheated sponge ply while the preheated plies are molded by contact with the drum.

7. Apparatus for making molded cushion-backed flooring from component plies, comprising a heated drum partially encircled by a pressure band, a conveyor for directing a face ply of uncured plastic compound between banks of heaters to said drum and so preheating it while on the conveyor, another conveyor for directing an unheated cushion ply in a separate unheated path to the bite of the drum and pressure band for passage about the drum with said cushion ply in direct contact with the pressure band, and segmental heaters for heating encircling portions of the band while in contact with the cushion ply and while the preheated face ply is molded by contact with the drum.

References Cited by the Examiner

UNITED STATES PATENTS

| | | | |
|---|---|---|---|
| 1,763,592 | 6/1930 | Maas | 156—555 |
| 2,039,271 | 4/1936 | Bierer. | |
| 2,288,054 | 6/1942 | Walton | 156—78 |
| 2,511,703 | 6/1950 | Ettl | 156—555 |
| 2,680,468 | 6/1954 | Lewis. | |
| 2,957,793 | 10/1960 | Dickey | 156—322 |
| 2,972,559 | 2/1961 | Allen et al. | 156—322 |
| 3,038,833 | 6/1962 | Glover | 156—322 |
| 3,062,698 | 11/1962 | Aykanian | 156—322 X |
| 3,093,525 | 6/1963 | Wilson et al. | 156—79 |
| 3,104,192 | 9/1963 | Hacklander. | |

EARL M. BERGERT, *Primary Examiner.*

CLIFTON B. COSBY, *Assistant Examiner.*